United States Patent
Todd et al.

(10) Patent No.: US 11,456,885 B1
(45) Date of Patent: Sep. 27, 2022

(54) DATA SET VALUATION FOR SERVICE PROVIDERS

(71) Applicant: EMC Corporation, Hopkinton, MA (US)

(72) Inventors: Stephen Todd, Shrewsbury, MA (US); David Dietrich, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1287 days.

(21) Appl. No.: 14/973,096

(22) Filed: Dec. 17, 2015

(51) Int. Cl.
*H04L 43/091* (2022.01)
*H04L 12/14* (2006.01)
*H04L 41/5061* (2022.01)
*G06Q 30/02* (2012.01)
*G06Q 50/30* (2012.01)

(52) U.S. Cl.
CPC ..... *H04L 12/1442* (2013.01); *G06Q 30/0283* (2013.01); *G06Q 50/30* (2013.01); *H04L 41/5064* (2013.01); *H04L 43/091* (2022.05)

(58) Field of Classification Search
CPC ............. H04L 12/1442; H04L 41/5035; H04L 41/5064; G06Q 30/0283; G06Q 50/30
See application file for complete search history.

(56) References Cited

U.S. PATENT DOCUMENTS

| | | | |
|---|---|---|---|
| 6,715,145 B1 | 3/2004 | Bowman-Amuah | |
| 6,957,227 B2 | 10/2005 | Fogel et al. | |
| 7,574,426 B1 | 8/2009 | Ortega | |
| 7,580,848 B2 | 8/2009 | Eder | |
| 7,752,195 B1 | 7/2010 | Hohwald et al. | |
| 7,890,451 B2 | 2/2011 | Cancel et al. | |
| 7,970,729 B2 | 6/2011 | Cozzi | |
| 8,561,012 B1 | 10/2013 | Holler et al. | |
| 9,262,451 B1 | 2/2016 | Singh et al. | |
| 9,384,226 B1 | 7/2016 | Goel et al. | |
| 9,465,825 B2 | 10/2016 | Nelke et al. | |
| 9,606,828 B2 | 3/2017 | Ghosh et al. | |
| 9,851,997 B2 | 12/2017 | Gough et al. | |
| 2001/0042062 A1 | 11/2001 | Tenev et al. | |
| 2004/0122646 A1 | 6/2004 | Colossi et al. | |
| 2005/0182739 A1 | 8/2005 | Dasu et al. | |
| 2007/0005383 A1 | 1/2007 | Kasower | |

(Continued)

OTHER PUBLICATIONS

Doug Laney, "The economics of information assets", Sep. 12, 2011, The Center for Infonomics, pp. 10-17 (https://www.smarter-companies.com/group/icpractitioners/forum/topics/abstract-and-slides-for-today-s-session-on-infonomics-by-doug; https://api.ning.com/files/S62CI6*7k9DQgTv8NpuGsHEEo4V0csxmLbIZW*T) (Year: 2011).*

(Continued)

*Primary Examiner* — Jeff Zimmerman
*Assistant Examiner* — Wayne S. Murray
(74) *Attorney, Agent, or Firm* — Ryan, Mason & Lewis, LLP

(57) ABSTRACT

Data set valuation techniques are provided. For example, a request is obtained from a client to utilize one or more cloud computing services managed by at least one service provider. A valuation is determined for delivering the one or more requested cloud computing services to the client. The (Continued)

valuation determination includes determining a valuation of one or more data sets associated with the one or more cloud computing services.

20 Claims, 10 Drawing Sheets

(56) References Cited

U.S. PATENT DOCUMENTS

| | | | | |
|---|---|---|---|---|
| 2008/0195542 | A1* | 8/2008 | Al Zarawani | G06Q 20/10 705/44 |
| 2009/0018996 | A1 | 1/2009 | Hunt et al. | |
| 2009/0282089 | A1 | 11/2009 | Lakshmanachar et al. | |
| 2009/0327921 | A1 | 12/2009 | Holm-Peterson et al. | |
| 2010/0094685 | A1 | 4/2010 | Young | |
| 2010/0153324 | A1 | 6/2010 | Downs et al. | |
| 2011/0055034 | A1* | 3/2011 | Ferris | G06Q 30/0283 705/26.1 |
| 2011/0055699 | A1 | 3/2011 | Li et al. | |
| 2011/0078603 | A1 | 3/2011 | Koomullil | |
| 2012/0016721 | A1* | 1/2012 | Weinman | G06Q 10/00 705/7.35 |
| 2012/0084261 | A1 | 4/2012 | Parab | |
| 2012/0116911 | A1* | 5/2012 | Irving | G06Q 30/02 705/26.4 |
| 2012/0123994 | A1 | 5/2012 | Lowry et al. | |
| 2012/0310684 | A1 | 12/2012 | Carter | |
| 2012/0323843 | A1 | 12/2012 | Bice et al. | |
| 2013/0036091 | A1 | 2/2013 | Provenzano et al. | |
| 2013/0055042 | A1 | 2/2013 | Al Za'noun et al. | |
| 2013/0073594 | A1 | 3/2013 | Jugulum et al. | |
| 2013/0110842 | A1 | 5/2013 | Donneau-Golencer et al. | |
| 2013/0151423 | A1 | 6/2013 | Schmidt et al. | |
| 2014/0052489 | A1 | 2/2014 | Prieto | |
| 2014/0324856 | A1 | 10/2014 | Lahiani et al. | |
| 2015/0120555 | A1 | 4/2015 | Jung et al. | |
| 2015/0134591 | A1 | 5/2015 | Staeben et al. | |
| 2015/0293974 | A1 | 10/2015 | Loo | |
| 2016/0055184 | A1 | 2/2016 | Fokoue-Nkoutche et al. | |
| 2016/0110819 | A1 | 4/2016 | Abramowitz | |
| 2016/0196311 | A1 | 7/2016 | Wang et al. | |
| 2016/0224430 | A1 | 8/2016 | Long et al. | |
| 2016/0378919 | A1* | 12/2016 | McNutt | G06Q 50/24 705/3 |
| 2017/0236060 | A1 | 8/2017 | Ignatyev | |
| 2017/0293655 | A1 | 10/2017 | Ananthanarayanan et al. | |

OTHER PUBLICATIONS

Laney, Doug, "The economics of information assets", Sep. 13, 2011, (https://www.smarter-companies.com/group/icpractitioners/forum/topics/abstract-and-slides-for-today-s-session-on-infonomics-by-doug; https://storage.ning.com/topology/rest/1.0/file/get/1681362777?profile=original) (Year: 2011).*

U.S. Appl. No. 14/863,783 filed in the name of Stephen Todd et al. on Sep. 24, 2015 and entitled "Unstructured Data Valuation."

U.S. Appl. No. 14/973,141 filed in the name of Stephen Todd et al. on Dec. 17, 2015 and entitled "Automated Data Set Valuation and Protection."

U.S. Appl. No. 14/973,178 filed in the name of Stephen Todd filed Dec. 17, 2015 and entitled "Timeliness Metrics and Data Valuation in Distributed Storage Systems."

U.S. Appl. No. 13/923,791 filed in the name of Stephen Todd et al. on Jun. 21, 2013 and entitled "Data Analytics Computing Resource Provisioning."

U.S. Appl. No. 14/744,886 filed in the name of Marina Zeldin et al. on Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Doug Laney, "The Economics of Information Assets," The Center For Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

* cited by examiner

100

200

300

400

500

800

900

DATA SET VALUATION FOR SERVICE PROVIDERS

FIELD

The field relates generally to data processing and, more particularly, to data set valuation for service providers.

BACKGROUND

A key aspect of managing a data processing system such as a cloud computing system is the notion of measured service whereby usage of a shared pool of configurable resources, such as compute elements, network elements, and storage elements, can be properly controlled and reported. Cloud computing is a model for enabling on-demand network access to the shared pool of configurable resources such that the resources can be rapidly provisioned and released with minimal management effort or service provider interaction. Measured service attempts to allow cloud computing service providers, for example, to properly keep track of usage of such resources by clients. However, adequate measured service can be challenging.

SUMMARY

Embodiments of the invention provide service provider techniques for valuation associated with data sets.

For example, in one embodiment, a method comprises the following steps. A request is obtained from a client to utilize one or more cloud computing services managed by at least one service provider. A valuation is determined for delivering the one or more requested cloud computing services to the client. The valuation determination comprises determining a valuation of one or more data sets associated with the one or more cloud computing services.

In another embodiment, a storage of valuation information is maintained for data sets associated with one or more cloud computing services managed by one or more service providers. One or more costs respectively associated with one or more of the data sets are computed for a client requesting the one or more cloud computing services, the one or more costs being computed based on the valuation information. The one or more computed costs are sent to the client to enable the client to perform a comparative valuation determination in selecting a service provider to provide a cloud computing service.

These and other features and advantages of the invention will become more readily apparent from the accompanying drawings and the following detailed description.

DETAILED DESCRIPTION

Figure 1:
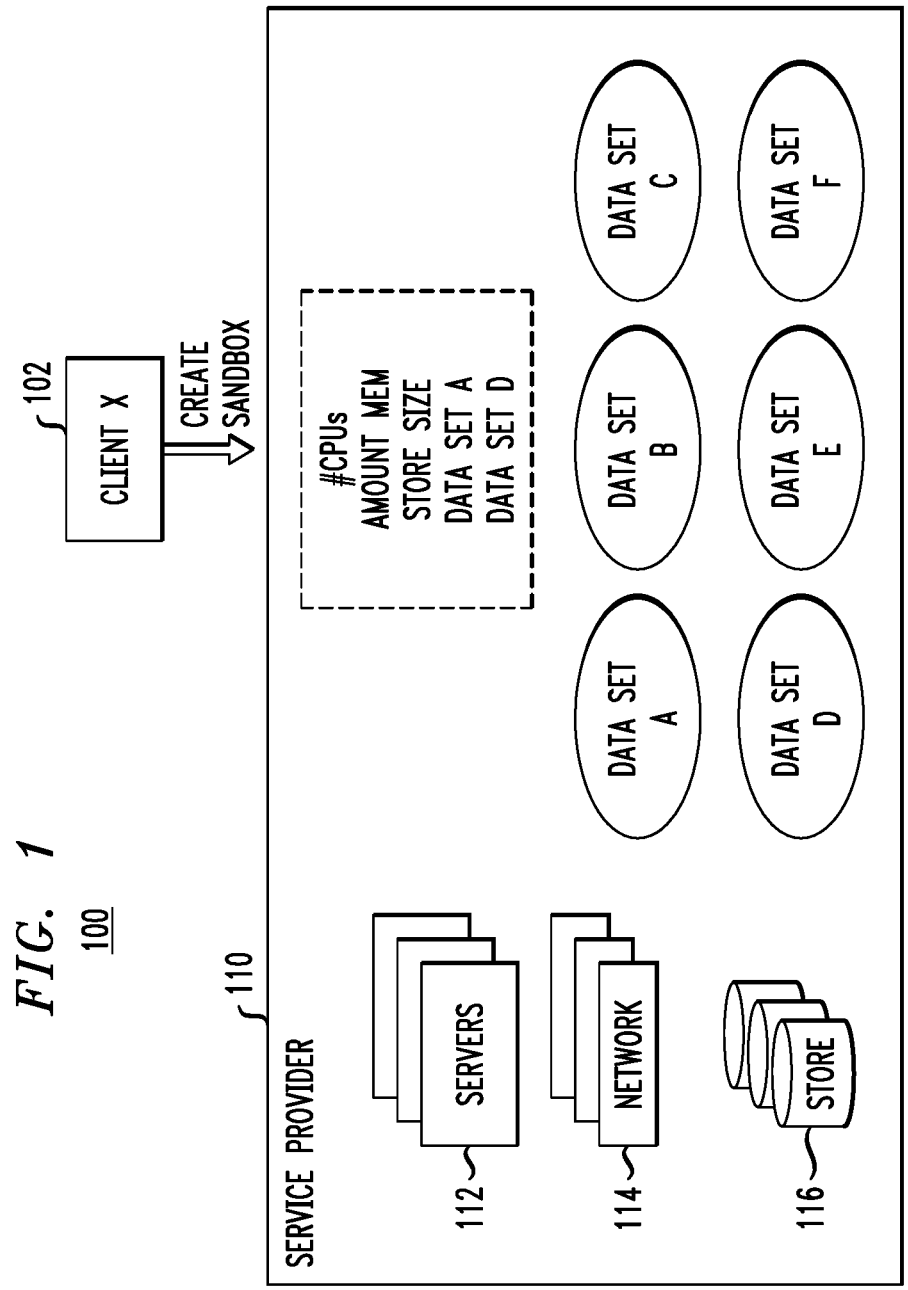
FIG. 1 illustrates an analytic sandbox-as-a-service environment according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices. Furthermore, while the cloud computing use case described herein relates to an analytic sandbox-as-a-service and, more particularly, to factoring in the value of data into the cost of provisioning an analytic sandbox, data valuation embodiments of the invention are not limited to such an illustrative service use case.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data), e.g., documents, free form text, images, etc.

It is realized herein that the cloud computing service provider industry has a conventional approach for how to advertise, measure, and bill for client use of compute, network, and storage resources. Note here that the term "client," refers to customers or end users of the cloud computing platform provided and managed by the service provider. Service providers create rates based on a variety of algorithms, many of which are based on service provider capital expenses and operational expenses for those resources. However, challenges and drawbacks exist with regard to conventional approaches. Embodiments of the invention overcome such challenges and drawbacks as will be explained in detail herein.

One form of usage by a client may include use of cloud computing resources as an "analytic sandbox" service. An analytic sandbox is an analytics environment including compute elements, network elements, and/or storage elements that allow someone (e.g., a data scientist) to condition and experiment with data sets. Proper measured service can better enable the service provider to plan for future demand for such resources to support analytic sandboxes and other services, as well as better enable the service provider to accurately allocate costs for usage of those resources.

Consider a service provider (or an information technology (IT) department) that provides analytic sandbox services on top of a rich catalogue of unique data sets. By way of example, cloud computing environment 100 in FIG. 1 illustrates a client (client X) 102 requesting the creation of an analytic sandbox (comprising one or more compute elements (servers) 112, network elements 114 and/or storage elements 116) that accesses data set A and data set D (from a plurality of data sets A through F) from a service provider 110. The data sets could each have their own domain-specific data (e.g., customer data, housing data, etc.).

Using the conventional (i.e., current or today's) technology and approach, the service provider 110 can provide initial and ongoing quotes for computing resources, but it is realized herein that charging an initial and/or ongoing fee for the use of analytic input data sets is not possible to do efficiently, nor is it possible to find an appropriate mechanism through which to charge a reasonable price for data access, usage, and value. It is also realized herein that this is because service providers currently do not have algorithms that allow them to associate value with a data set in a repeatable way. In some cases the value of a data set may not be programmatically calculated but may be the result of a purchase of a data asset.

It is further realized herein that today's service providers do not have application programming interfaces (APIs) that allow them to associate a value with a data set (e.g., the purchase price), nor do they have an API that allows them to retrieve that value in a consistent manner. It is also realized herein that different data sets, different clients, and different market conditions may all contribute to the need for dynamic pricing models that can be leveraged at different times and for different reasons. This capability currently does not exist for today's service providers. Furthermore, it is realized herein that there is no existing method for combining data value pricing with infrastructure pricing to come up with an overall price for the client, nor is there any method for generating value-based billing for the client that also includes infrastructure consumption.

Embodiments of the invention overcome the above and other drawbacks associated with conventional technology and approaches by providing a data valuation framework into an IT environment that enables the use of the value of a data set as part of the operational enterprise model.

Figure 2:
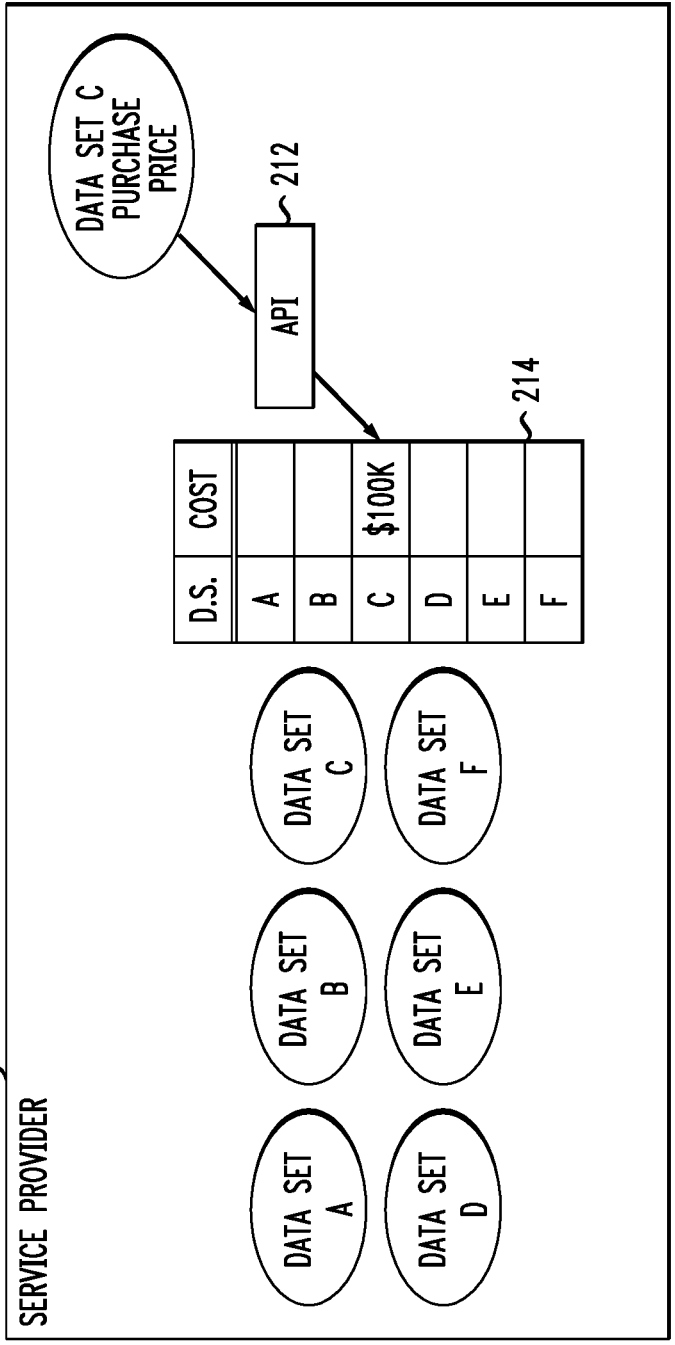
FIG. 2 illustrates data set valuation association according to an embodiment of the invention.

In one illustrative embodiment, as shown in the context of cloud computing environment 200 in FIG. 2, a valuation framework employed by a service provider 210 includes an API 212 for associating value with data sets in a data store 214. FIG. 2 illustrates an example of a data set (data set C) previously purchased by the service provider, and the purchase price being stored through an API and recording the cost associated with the data set. This cost could in theory be associated with different values, of which purchase price is an option.

In addition to the acquisition cost recorded for data set C as illustrated in FIG. 2, illustrative embodiments provide for employing additional data valuation methodologies that can be run and valuation results stored for data set C.

Figure 3:
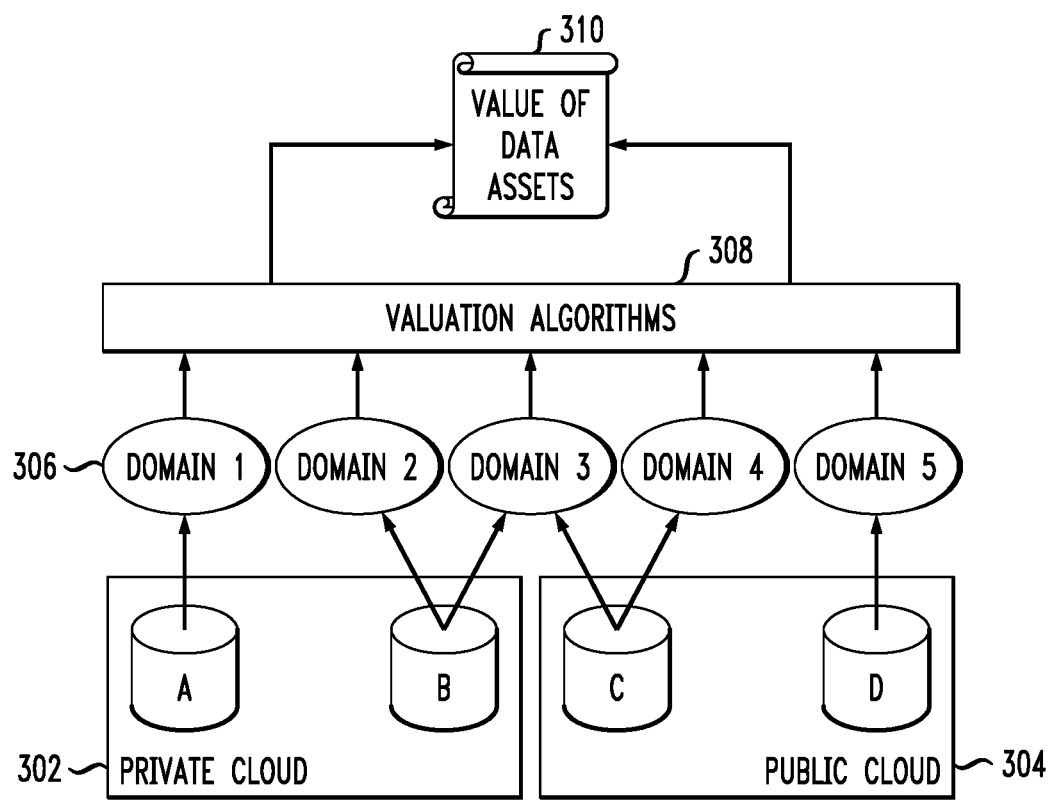
FIG. 3 illustrates a data valuation for unstructured data that can be employed with embodiments of the invention.

By way of one example only, FIG. 3 illustrates a valuation methodology 300 for unstructured data. This methodology is described in the U.S. patent application identified as Ser. No. 14/863,783, entitled "Unstructured Data Valuation," filed on Sep. 24, 2015, the disclosure of which is incorporated by reference herein. More particularly, methodology 300 in FIG. 3 illustrates a data valuation methodology wherein it is assumed that data repositories A and B that are part of a private cloud environment 302 and data repositories C and D that are part of a public cloud environment 304. Each repository contains one or more data sets (e.g., documents) that would benefit from data valuation. Assume also that each of the documents in data repositories A, B, C and D are processed to generate domain aware tokens. These domain aware tokens are grouped in domains 306 (domain 1 through domain 5). That is, domains 1 through 5 are subject matter domains to which the tokens are mapped (e.g., legal, finance, etc.). Despite being mapped to domains, the tokens still maintain their identification with the document from which they belong. By way of example only, metadata can be generated, such as an identifier (ID), and associated with (stored, attached, etc.) a token that identifies the document from which the token was derived.

The domain aware tokens are provided to valuation algorithms 308. A different valuation algorithm may be used for each context. As will be explained in detail, a value V is returned for each document based on the domain aware tokens for that document that are provided to the valuation algorithms 308. These values are denoted as 310 in FIG. 3. Thus, advantageously, domain-specific analysis results in a set of domain specific mapping results, some unique to each data set and some shared. The valuation algorithms 308 convert domains to a business value, as will be explained.

Assume each value V of content c for context x is calculated by the valuation algorithms 308 as follows:

$$V(c,x)=f(\{\text{outside-actors}\},\{\text{domain-specific-tokens}\},\{\text{domain-specific-token-metadata}\})$$

where $f(\ )$ represents a function, and where domain-specific-token-metadata can be a computed value from the tokens. One example of domain-specific-token-metadata is a distance between two tokens. For example, the distance may be a cosine distance based on two vectorized tokens which illustrates how closely two tokens are semantically related. Metadata may also be system type metadata (e.g., time, date, etc. associated with the system doing the computations, as well as document identifiers for the tokens as mentioned above) and/or user-generated (custom) metadata. Outside factors are at least part of the context provided by the user (or other system) using the system. Then, embodiments build one or more indices of the relevant domain specific tokens and factors to re-evaluate the value V of content for each given context. FIG. 3 may be referred to as an unstructured tokenization algorithm (UTA).

By way of another non-limiting example, one or more of the data valuation models described in D. Laney, "The Economics of Information Assets," The Center for Infonomics, Smarter Companies presentation, September 2011, may be employed as data valuation methodologies used by framework 210. Such valuation models include a set of non-financial models and set of financial models. As shown, the non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of a value of how the data set contributes to a financial bottom line.

It is to be appreciated that valuation factors that change due to some change in the data may be considered dynamic factors. In contrast, a factor such as initial purchase price is a static or fixed factor. Embodiments of the invention may utilize static factors and/or dynamic factors.

It is to be further understood that service provider valuation frameworks according to embodiments of the invention are not limited to usage of the data valuation methodologies described above. Rather, other methodologies may be employed to provide data valuation results for a given data set that can then be stored through an API according to illustrative embodiments described herein.

Figure 4:
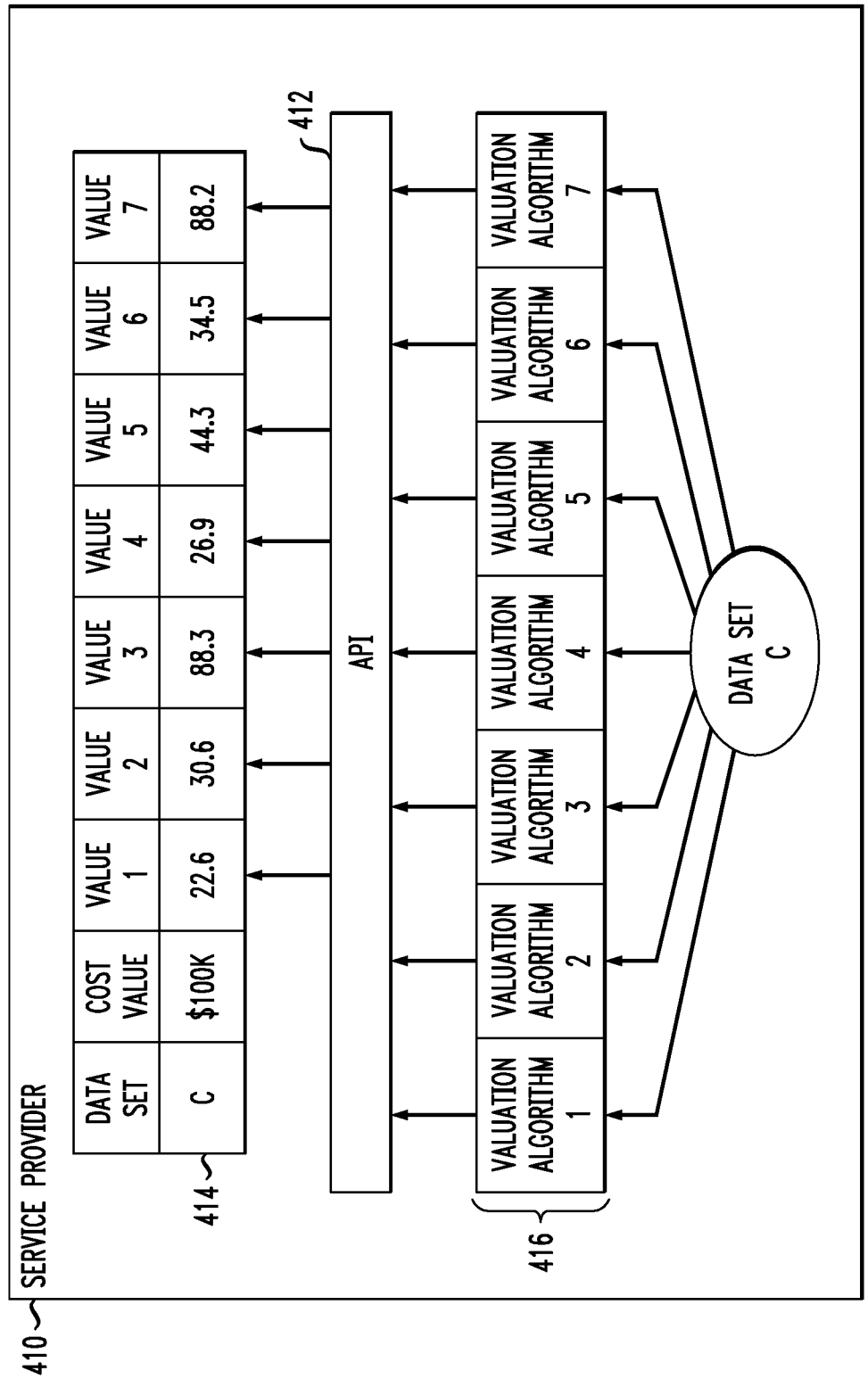
FIG. 4 illustrates data valuation methodology according to an embodiment of the invention.

FIG. 4 illustrates a cloud computing environment 400 for a service provider 410 whereby additional valuation measures are associated with data set C. More particularly, in addition to the acquisition cost previously recorded for data set C (as shown in FIG. 2), FIG. 4 illustrates a number of algorithms 416 that access data set C in order to run their specific algorithm for calculating value. The algorithms may include one or more data valuation methodologies described above (e.g., UTA, etc.) and/or other known data valuation methodologies. These algorithms can also access the API 412 in order to store output results in the valuation table 414 for data set C. Table 414 shows illustrative values computed for each of the data valuation algorithms specified therein.

The service provider valuation framework according to illustrative embodiments can contain static algorithms that calculate pricing for data sets based on a valuation table (e.g., 214, 414) and customer requests. For example, the service provider may estimate that over time 200 clients will wish to access data set C. Thus, in an effort to recoup the expense of purchasing data set C, the provider calculates the price for accessing data set C by dividing $100K by 200 and statically calculates a value of $500 per client.

Figure 5:
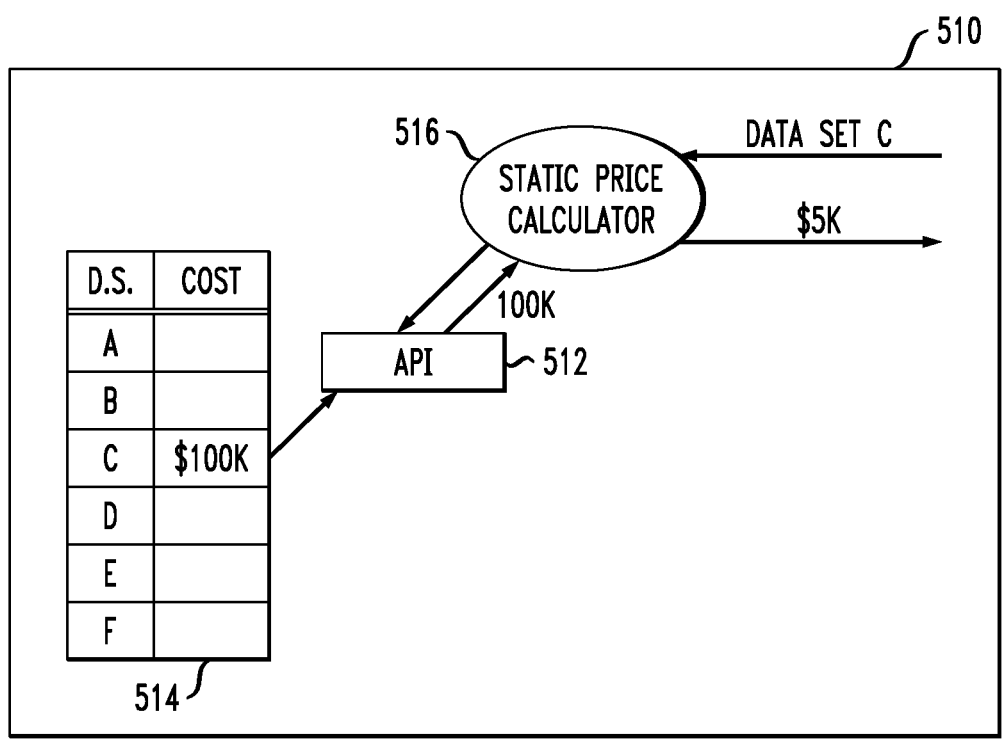
FIG. 5 illustrates a static valuation methodology according to an embodiment of the invention.

FIG. 5 illustrates a cloud computing environment 500 wherein a service provider 510 has already stored the purchase price ($100K) of data set C in table 514 (as previously highlighted in FIG. 2). Then, a static price calculator 516 accesses that value through API 512 and calculates the per client cost ($5K assuming 20 clients requesting access to data set C). It is to be appreciated that the static price calculator 516 can also implement a "cost plus" approach that attempts to not only recoup the cost but add a margin for profitability.

The service provider valuation framework according to illustrative embodiments can also implement dynamic pricing algorithms that programmatically take into account other factors that can be used in the calculation of price. For example, a service provider may decide to create a pricing algorithm based on the competitive available value of information. A data availability (exclusivity or scarcity) factor is a measure of the number of competitors that are assumed to have availability of the given data set.

There are a number of potential ways to determine scarcity that are manual (e.g., best guess made by a data broker or data trader), programmatic (e.g., continual automated scan of available data sets and measuring semantic equivalence), or based on wisdom of crowds to assess market value of data sets. Scarcity can be stored in a valuation table, as a tuple, or obtained in real-time from an external source. Scarcity allows a service provider, for example, to create classes of pricing.

Figure 6:
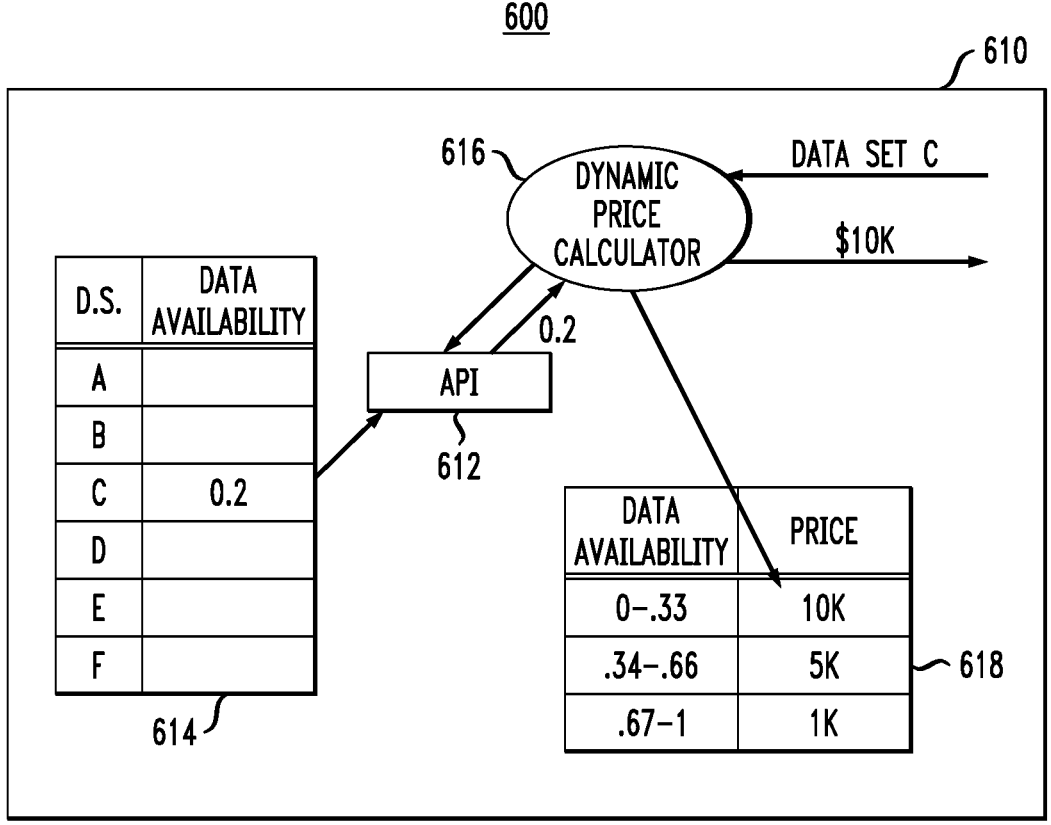
FIG. 6 illustrates a dynamic valuation methodology according to an embodiment of the invention.

FIG. 6 shows a dynamic price calculator that assigns pricing based on data availability (e.g., scarcity). That is, as shown in cloud computing environment 600, a service provider 610 stores through API 612 a scarcity percentage associated with data set C (e.g., 0.2) in table 614. Then, a dynamic price calculator 616 accesses that value through API 612 and determines the cost for clients to access data set C based on a scarcity pricing class table 618. Thus, in this example, it is assumed that the current scarcity percentage stored for data set C is 0.2 (20% of the market of competitors also likely have data set C). Note that 0.2 falls into class 0-0.33 in table 618. Therefore, the price for data set C is determined by dynamic price calculator 616 to be $10K. Note that if at a later time, the scarcity associated with data set C changes (determined manually or programmatically, as explained above), then the cost for data set C would change. For example, if it is determined that data set C is now available to more competitors, then the scarcity percentage increases (e.g., moves into class 0.34-0.66 in table 618) and the cost to clients of the service provider would decrease (e.g., $5K).

Figure 7:
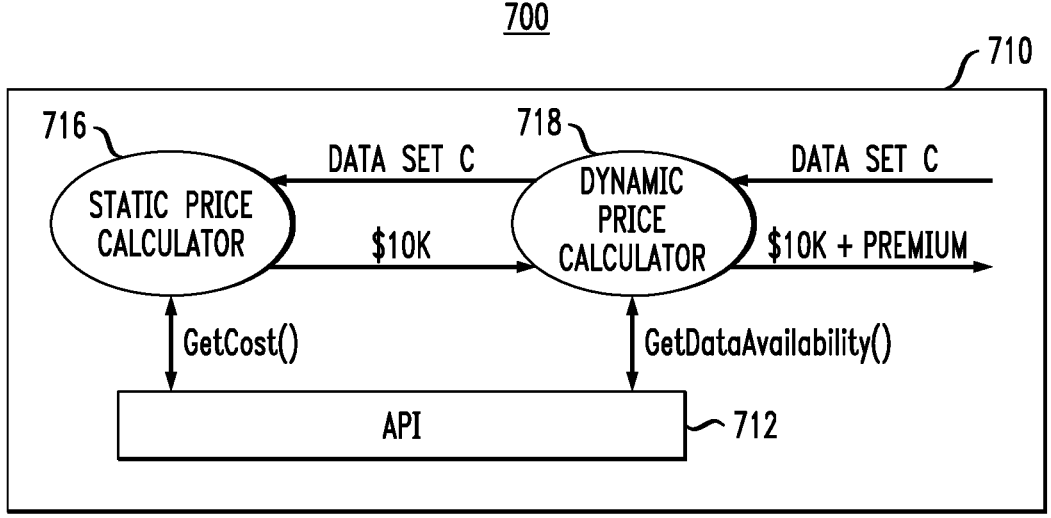
FIG. 7 illustrates a combined static and dynamic valuation methodology according to an embodiment of the invention.

Similarly, data availability/scarcity (as shown in FIG. 6) can be dynamically combined with the static-based approach (as shown in FIG. 5) to add an additional premium on top of any statically-calculated price. FIG. 7 illustrates this flow. As shown, in cloud computing environment 700, a service provider 710 utilizes a static price calculator 716 and a dynamic price calculator 718 to access, via API 712, valuation information stored for data set C (note that the storage table accessible through API 712 is not expressly shown but is a combination of those shown in FIGS. 5 and 6). Thus, as shown, static price calculator 716 obtains the purchase cost of data set C (e.g., $10K). Dynamic price calculator 718 obtains the cost as a function of scarcity and then adds that cost as a "premium" onto the purchase cost ($10K+Premium) and returns that total cost to the service provider for charging the requesting client.

It is to be understood that while the example in FIG. 7 relies on one attribute (data availability/scarcity), there are many other attributes that can be used to dynamically calculate data price. By way of example only, one or more other measures can be used such as, but not limited to:

Validity: percentage of records presumed to be correct
Completeness: percentage of total records versus the universe of potential or supposed data
Life cycle: reasonable usage duration
Relevance: how useful the data could be to the business
Timeliness: how quickly the data is captured and available In addition, an ensemble approach can be employed in order to derive a fair market value for a given data set based on the multitude of approaches for data valuation to derive a consistent baseline of value for a data set in a given context or to a potential user of the data set.

In accordance with illustrative embodiments, pricing algorithms can combine valuation information with information about the client that is asking for the data set in order to determine a dynamic price for the client's access of that data.

This approach relies on client "context" to be fed into a dynamic pricing algorithm. This context can be passed in directly from the client or inferred by other methods. The context can include, but is not limited to, such information as:

The risk profile of the client

The vertical market the customer is interested in (e.g., oil & gas)

Keywords describing the client

The client context can be internally fed into the service provider valuation framework as a way of calculating the relevance of the data set to the client.

Figure 8:
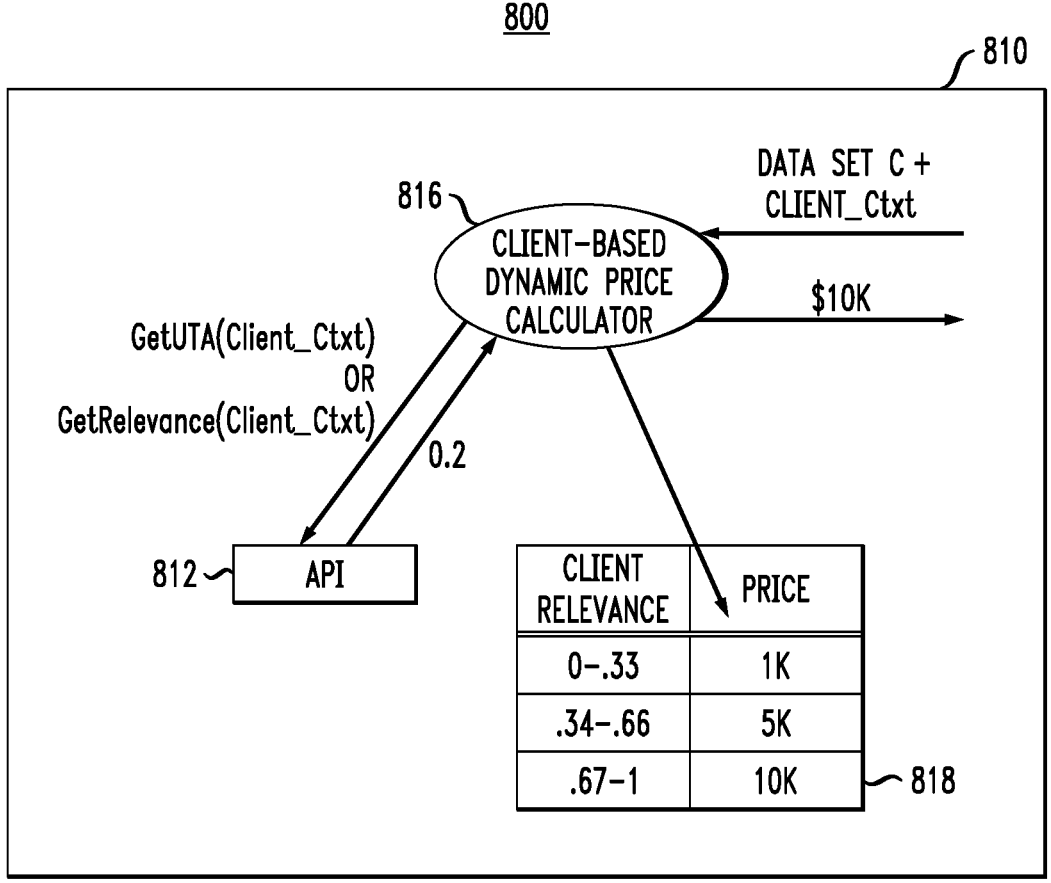
FIG. 8 illustrates a client-based valuation methodology according to an embodiment of the invention.

FIG. 8 illustrates client context being passed into a dynamic pricing algorithm leveraging a UTA algorithm (described in the above-referenced Ser. No. 14/863,783) or relevance attributes calculated as part of another valuation calculation (e.g., business value of information model). More particularly, in cloud computing environment 800, a service provider 810 utilizes a client-based dynamic price calculator 816 to access via API 812 valuation information stored for data set C (note that the storage table accessible through API 812 is not expressly shown but is similar to those described above). As shown, the client-based dynamic price calculator 816 forwards the client context to API 812 and then obtains via API 812 the valuation information for data set C (e.g., client relevance value 0.2) in the context of a specific client. Then, the client-based dynamic price calculator 816 determines the cost for that client to access data set C based on a client relevance pricing class table 818. Thus, in this example, it is assumed that the current client relevance percentage stored for data set C is 0.2. Note that 0.2 falls into class 0-0.33 in table 818. Therefore, the price for data set C is determined by client-based dynamic price calculator 816 to be $1K. Note that if at a later time, it is determined that the relevance of data set C to the client changes (determined manually or programmatically, as explained above), then the cost for data set C would change. For example, if it is determined that data set C is now more relevant to the client, then the client relevance increases (e.g., moves into class 0.34-0.66 in table 818) and the cost to the client would increase.

Figure 9:
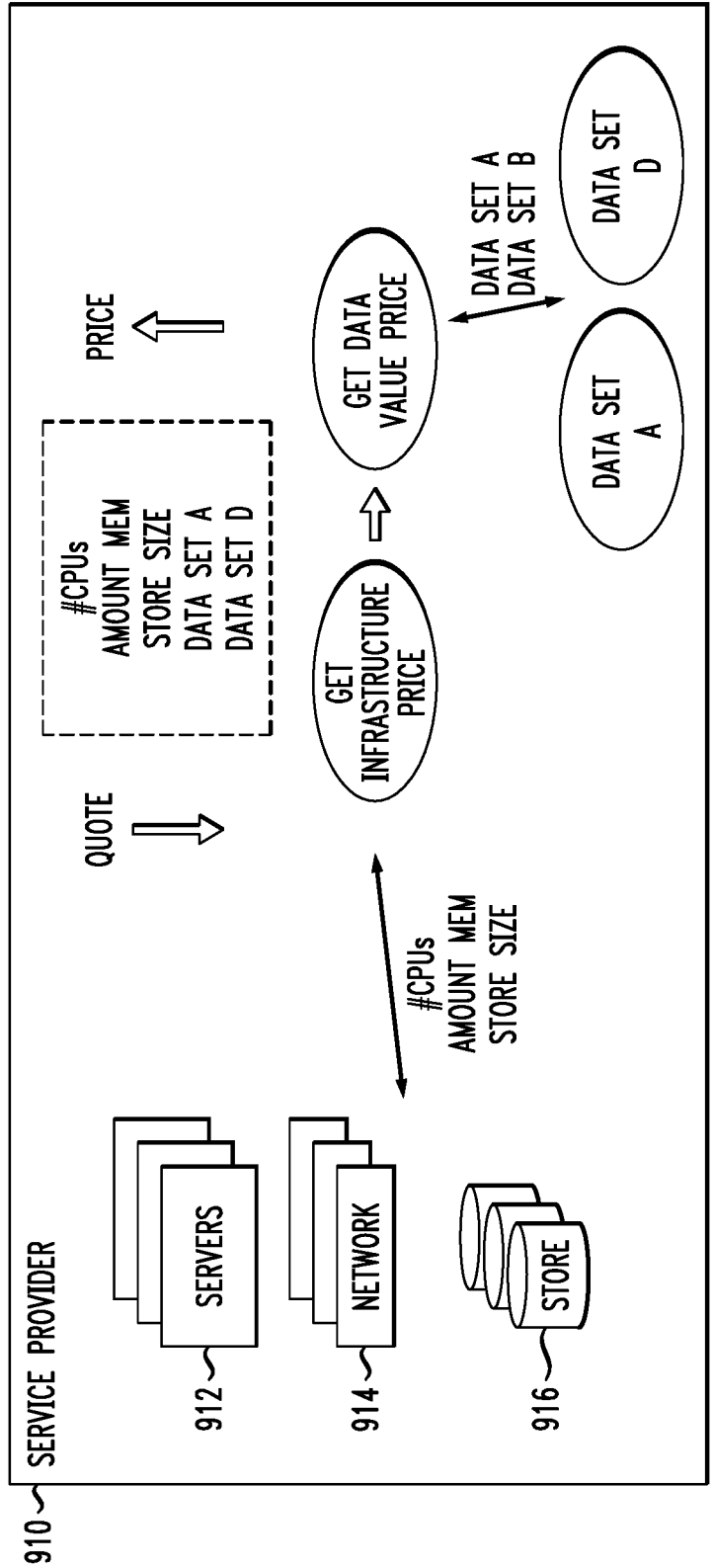
FIG. 9 illustrates an infrastructure and data valuation methodology according to an embodiment of the invention.

The request to a service provider for Analytics-as-a-Service can also come with a set of infrastructure requirements that will result in an overall price that now can include data valuation-based pricing, in accordance with embodiments described herein, as part of an overall quote. FIG. 9 illustrates this combined infrastructure valuation/data set valuation approach. More particularly, cloud computing environment 900 illustrates a client (client X) 902 requesting from a service provider 910 the creation of an analytic sandbox (comprising one or more compute elements (servers) 912, network elements 914 and/or storage elements 916) that accesses data set A and data set D (from a plurality of data sets A through D). Again, the data sets could each have their own domain-specific data (e.g., customer data, housing data, etc.).

In comparison to the FIG. 1 embodiment, the service provider valuation framework in FIG. 9 takes into account not only a data set valuation but also a valuation for the infrastructure (e.g., compute, network, and/or storage elements) needed to provide the analytic sandbox to the requesting client. Valuation of infrastructure may be determined in a conventional manner. Then, a price based on the infrastructure valuation and the data set valuation is calculated and provided to the client.

An additional benefit of a data valuation framework according to embodiments described herein is that the framework enables, for the first time, the ability to provide comparative valuation services across disparate data sets. Consider the example of several service providers possessing a variety of data sets that have associated valuation tables and/or pricing models. A data broker engine according to an embodiment of the invention can provide comparison value and/or pricing choices to a client and list different data sets for potential use by a client.

Figure 10A:
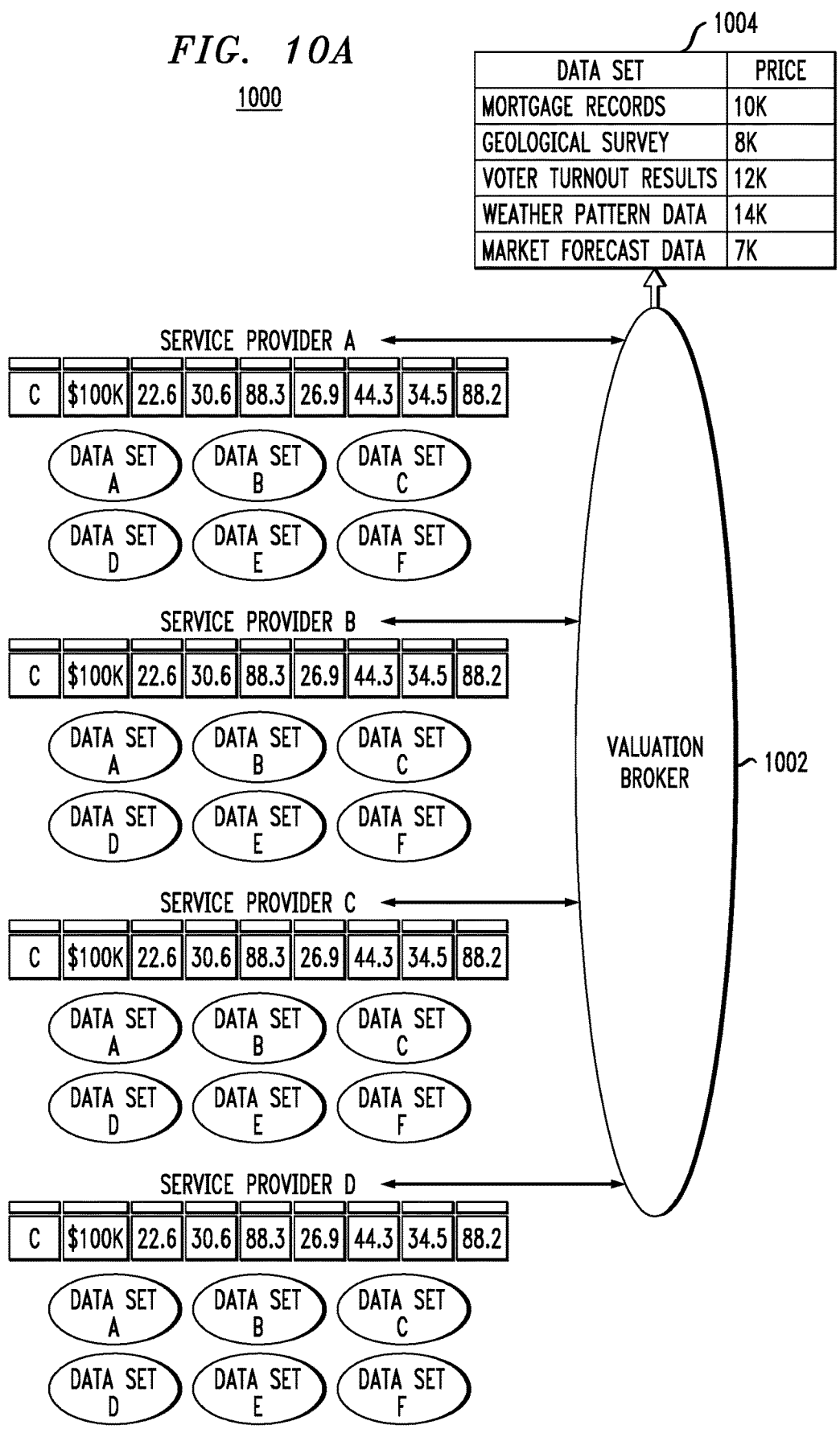
FIG. 10A illustrates a data valuation broker methodology according to an embodiment of the invention.

FIG. 10A illustrates a cloud computing environment 1000 with a valuation broker 1002 that is configured to use one or more of the valuation techniques described herein to display data set options to a client, either for sandbox purposes or data set acquisition purposes. By way of example only, as shown, valuation broker 1002 can provide comparison value and/or pricing choices to a client and list different data sets for potential use by a client, e.g., table 1004.

The data valuation broker 1002, as a potential service provider, can also create and/or execute dynamic algorithms that steer risky or low value clients towards competitive service providers for their data needs, and/or heavily discount their own data sets as compared to other service providers in order to gain market advantage and attract the most high-value clients.

Figure 10B:
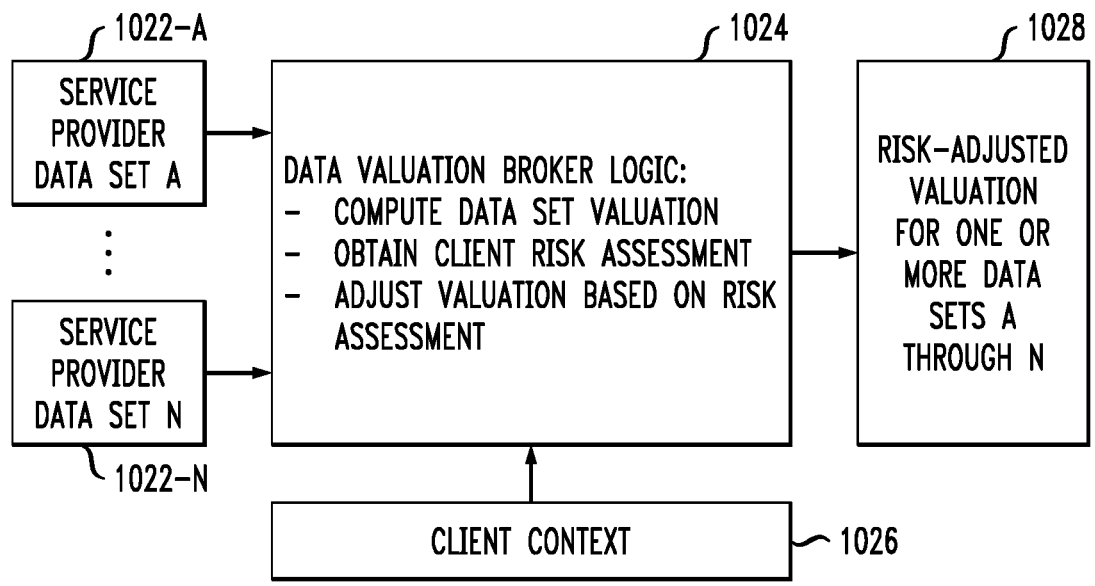
FIG. 10B illustrates data valuation broker logic according to an embodiment of the invention.

FIG. 10B illustrates data valuation broker logic according to an embodiment of the invention. As shown in cloud computing environment 1020, service provider data sets A through N (1022-A, . . . , 1022-N) are accessible by data valuation broker logic 1024 (part of valuation broker 1002 in FIG. 10A). Broker logic 1024 also obtains client context information 1026. Based on the client context information, broker logic 1024 determines valuations for one or more data sets.

In one example, as shown, broker logic 1024 computes a data set valuation using one or more of the valuation methods described herein. Then, based on the obtained client context information 1026, the broker logic 1024 adjusts the valuation already computed based on some risk assessment criterion, resulting in a risk-adjusted valuation 1028 for one or more of the data sets A through N. That is, in one example scenario, the broker logic 1024 may generate a lower price for low-risk customers and a higher price for high-risk customers. This is accomplished by first calculating a valuation and then either discounting it or inflating it based on assessment of risk for a given client based on context information 1026.

By way of one example only, assume an entity manages a data store containing data for gun permits in the United States. Assume also that the entity implements valuation broker logic 1024. As a data broker, the entity may license this data to a lobby group, a politician, or a governmental agency in order to examine situations where there is a high density of people with guns and/or incidents for potential implications for new or revised legislation. Now consider if someone wants to purchase the data and the entity feels the purchaser has ties to a criminal group or other illicit activity, or other less savory pursuit than research (which is determined from client context information 1026).

First, in this use case, the entity would want a way to flag such a situation and not even offer the data (i.e., the risk alone may cease a transaction). Conversely, the entity may set a constraint to offer more favorable pricing for the data for academic research purposes, e.g., university faculty might want to license the data to work with a student for a specific research project. Advantageously, the data valuation broker logic 1024 can be configured to perform these risk assessment and valuation adjustment (or transaction cessation) actions. It is to be understood that risk assessment may also be business risk-related or some other form of risk rather than the criminal risk in the above illustrative use case.

Figure 11:
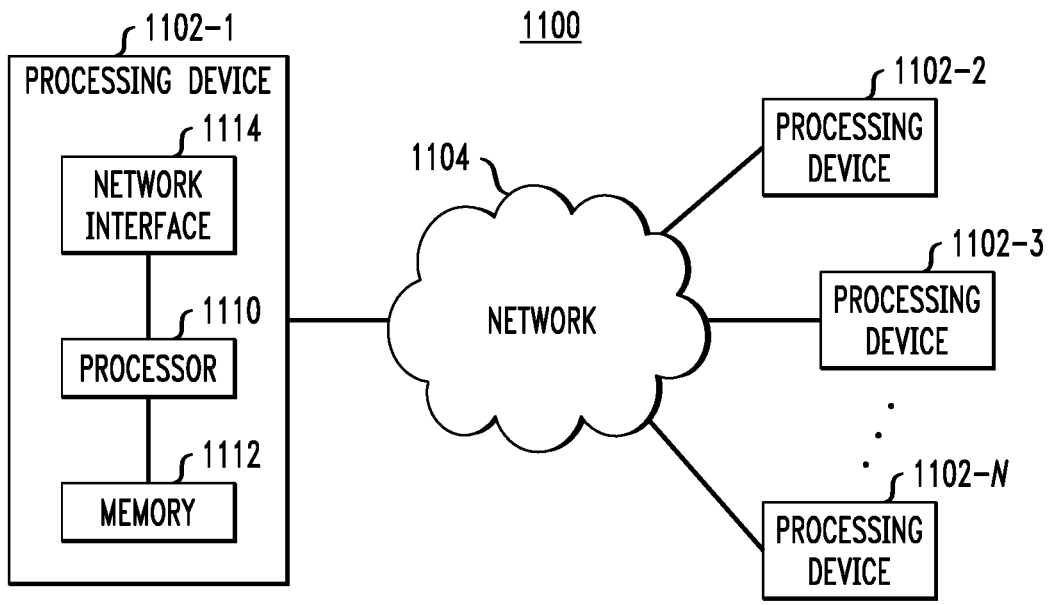
FIG. 11 illustrates a processing platform used to implement a cloud infrastructure environment in which data valuation techniques are implemented according to an embodiment of the invention.

As an example of a processing platform on which a cloud infrastructure environment with data valuation (system and methodologies) according to illustrative embodiments can be implemented is processing platform 1100 shown in FIG. 11. The processing platform 1100 in this embodiment comprises a plurality of processing devices, denoted 1102-1, 1102-2, 1102-3, ... 1102-N, which communicate with one another over a network 1104. It is to be appreciated that the data valuation methodologies described herein may be executed in one such processing device 1102, or executed in a distributed manner across two or more such processing devices 1102. The cloud infrastructure environment may also be executed in a distributed manner across two or more such processing devices 1102. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 11, such a device comprises at least one processor and an associated memory, and implements one or more functional modules for instantiating and/or controlling features of systems and methodologies described herein. Multiple elements or modules may be implemented by a single processing device in a given embodiment.

The processing device 1102-1 in the processing platform 1100 comprises a processor 1110 coupled to a memory 1112. The processor 1110 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1110. Memory 1112 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1112 may comprise electronic memory such as random access memory (RAM), read-only memory (ROM) or other types of memory, in any combination. The one or more software programs when executed by a processing device, such as the processing device 1102-1, causes the device to perform functions associated with one or more of the components/steps of system/methodologies in FIGS. 1-10B. One skilled in the art would be readily able to implement such software given the teachings provided herein. Other examples of processor-readable storage media embodying embodiments of the invention may include, for example, optical or magnetic disks.

Processing device 1102-1 also includes network interface circuitry 1114, which is used to interface the device with the network 704 and other system components. Such circuitry may comprise conventional transceivers of a type well known in the art.

The other processing devices 1102 (1102-2, 1102-3, ... 1102-N) of the processing platform 1100 are assumed to be configured in a manner similar to that shown for computing device 1102-1 in the figure.

The processing platform 1100 shown in FIG. 11 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 1100. Such components can communicate with other elements of the processing platform 1100 over any type of network, such as a wide area network (WAN), a local area network (LAN), a satellite network, a telephone or cable network, or various portions or combinations of these and other types of networks.

Furthermore, it is to be appreciated that the processing platform 1100 of FIG. 11 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1100 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1100 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   obtaining a request from a client to utilize one or more cloud computing services managed by at least one service provider;
   in response to a request by the at least one service provider, accessing a valuation framework through one or more application programming interfaces coupled to the valuation framework to obtain:
      one or more values of one or more data sets within the valuation framework of a data storage infrastructure associated with the one or more cloud computing services; and
      one or more dynamic attribute factor metrics associated with the one or more data sets;
   computing a data value, based at least in part on the one or more values and the one or more dynamic attribute factor metrics of the one or more data sets, representing a data cost to access the one or more data sets;
   determining a valuation of the data storage infrastructure associated with the one or more cloud computing services storing the one or more data sets, the valuation of the data storage infrastructure being based at least in part on one or more compute, network or storage components of the data value storage infrastructure;
   calculating a client cost to utilize one or more cloud computing services based at least in part on the data cost and the valuation of the data storage infrastructure; and
   sending the client cost to at least one of the at least one service provider and the client;
   wherein the data value comprises a dynamic value associated with the client requesting the one or more cloud computing services, the dynamic value adjusting a previously-computed valuation of the one or more data sets, the dynamic value associated with the client requesting the one or more cloud computing services being based at least in part on:
      a risk profile of the client requesting the one or more cloud computing services, the risk profile characterizing an expected type of use of the one or more data sets by the client; and
      a relevance of the one or more data sets to the client requesting the one or more cloud computing services; and
   wherein the above steps are performed in accordance with a processor and a memory.

2. The method of claim 1, wherein accessing the valuation framework includes accessing one or more static values of the one or more data sets associated with the one or more cloud computing services.

3. The method of claim 2, wherein the data value corresponding to the one or more data sets is computed using one or more data valuation methodologies.

4. The method of claim 3, wherein the data value is computed by the one or more valuation algorithms which are accessible through the one or more application programming interfaces.

5. The method of claim 4, wherein the data value representing the data cost is a product of the one or more static values and the one or more dynamic attribute factor metrics of the one or more data sets.

6. The method of claim 5, wherein the one or more dynamic attribute factor metrics comprise at least one of accessibility, validity, accuracy, completeness, life cycle, usage duration, relevance and timelines of the one or more data sets.

7. The method of claim 6, wherein the data cost is determined for a given dynamic value class from a plurality of dynamic value classes wherein different dynamic value classes have different data costs.

8. The method of claim 1, wherein the one or more cloud computing services comprises an analytic sandbox service.

9. An article of manufacture comprising a processor-readable storage medium having encoded therein executable code of one or more software programs, wherein the one or more software programs when executed by one or more processing devices implement the steps of:
   obtaining a request from a client to utilize one or more cloud computing services managed by at least one service provider;
   in response to a request by the at least one service provider, accessing a valuation framework through one or more application programming interfaces coupled to the valuation framework to obtain:
      one or more values of one or more data sets within the valuation framework of a data storage infrastructure associated with the one or more cloud computing services; and
      one or more dynamic attribute factor metrics associated with the one or more data sets;
   computing a data value, based at least in part on the one or more values and the one or more dynamic attribute factor metrics of the one or more data sets, representing a data cost to access the one or more data sets;
   determining a valuation of the data storage infrastructure associated with the one or more cloud computing services storing the one or more data sets, the valuation of the data storage infrastructure being based at least in part on one or more compute, network or storage components of the data value storage infrastructure;
   calculating a client cost to utilize one or more cloud computing services based at least in part on the data cost and the valuation of the data storage infrastructure; and
   sending the client cost to at least one of the at least one service provider and the client;
   wherein the data value comprises a dynamic value associated with the client requesting the one or more cloud computing services, the dynamic value adjusting a previously-computed valuation of the one or more data sets, the dynamic value associated with the client requesting the one or more cloud computing services being based at least in part on:
   a risk profile of the client requesting the one or more cloud computing services, the risk profile characterizing an expected type of use of the one or more data sets by the client; and
   a relevance of the one or more data sets to the client requesting the one or more cloud computing services.

10. The article of manufacture of claim 9, wherein the one or more dynamic attribute factor metrics comprise at least one of accessibility, validity, accuracy, completeness, life cycle, usage duration, relevance and timelines of the one or more data sets.

11. The article of manufacture of claim 9, wherein the data cost is determined for a given dynamic value class from a plurality of dynamic value classes wherein different dynamic value classes have different data costs.

12. A system comprising:
   a plurality of processors operatively coupled to one or more memories and in communication via a network configured to:
     obtain a request from a client to utilize one or more cloud computing services managed by at least one service provider;
     in response to a request by the at least one service provider, access a valuation framework through one or more application programming interfaces coupled to the valuation framework to obtain:
       one or more values of one or more data sets within the valuation framework of a data storage infrastructure associated with the one or more cloud computing services; and
       one or more dynamic attribute factor metrics associated with the one or more data sets;
     compute a data value, based at least in part on the one or more values and the one or more dynamic attribute factor metrics of the one or more data sets, representing a data cost to access the one or more data sets;
     determine a valuation of the data storage infrastructure associated with the one or more cloud computing services storing the one or more data sets, the valuation of the data storage infrastructure being based at least in part on one or more compute, network or storage components of the data value storage infrastructure;
     calculate a client cost to utilize one or more cloud computing services based at least in part on the data cost and the valuation of the data storage infrastructure; and
     send the client cost to at least one of the at least one service provider and the client;
   wherein the data value comprises a dynamic value associated with the client requesting the one or more cloud computing services, the dynamic value adjusting a previously-computed valuation of the one or more data sets, the dynamic value associated with the client requesting the one or more cloud computing services being based at least in part on:
     a risk profile of the client requesting the one or more cloud computing services, the risk profile characterizing an expected type of use of the one or more data sets by the client; and
     a relevance of the one or more data sets to the client requesting the one or more cloud computing services.

13. The system of claim 12, wherein accessing the valuation framework includes accessing one or more static values of the one or more data sets associated with the one or more cloud computing services.

14. The system of claim 13, wherein the data value corresponding to the one or more data sets is computed using one or more data valuation methodologies.

15. The system of claim 14, wherein the data value is computed by the one or more valuation algorithms which are accessible through the one or more application programming interfaces.

16. The system of claim 15, wherein the data value representing the data cost is a product of the one or more static values and the one or more dynamic attribute factor metrics of the one or more data sets.

17. The system of claim 16, wherein the one or more dynamic attribute factor metrics comprise at least one of accessibility, validity, accuracy, completeness, life cycle, usage duration, relevance and timelines of the one or more data sets.

18. A method comprising:
   maintaining a storage of valuation information for different data sets associated with one or more cloud computing services managed by a plurality of service providers;
   computing, with one or more data valuation algorithms, one or more data costs respectively associated with the different data sets for a client requesting the one or more cloud computing services, the one or more data costs being computed based at least in part on (i) one or more values of one or more data sets within a valuation framework of a data storage infrastructure associated with the one or more cloud computing services and (ii) one or more dynamic attribute factor metrics associated with the one or more data sets;
   determining, with one or more infrastructure valuation algorithms, data storage infrastructure valuations for one or more data value storage infrastructures associated with the one or more cloud computing services storing the one or more data sets, the one or more data storage infrastructure valuations being at least based in part on one or more compute, network or storage components of the one or more data value storage infrastructures;
   creating, with a data broker engine coupled to the different data sets, the data storage infrastructure valuations and the service providers, a comparison listing of respective data costs for the respective data sets, the one or more data storage infrastructure valuations and choices of respective service providers; and
   displaying the comparison listing to the client, wherein the comparison listing displayed to the client is based at least in part on a dynamic value associated with the client requesting the one or more cloud computing services, the dynamic value adjusting previously-computed valuations of the respective data sets, the dynamic value associated with the client requesting the one or more cloud computing service being based at least in part on a risk profile of the client requesting the one or more cloud computing services and a relevance of the one or more data sets to the client requesting the one or more cloud computing services, the risk profile characterizing an expected type of use of the one or more data sets by the client;

wherein the above steps are performed in accordance with a processor and a memory.

19. The method of claim 18, further comprising utilizing broker logic of the processor to adjust respective client costs of the comparison listing based on the dynamic value associated with the client requesting the one or more cloud computing services.

20. The method of claim 19, wherein adjusting the respective client costs further comprises lowering pricing for a low-risk client and raising the client costs for a high-risk client.

* * * * *